US012162031B2

(12) United States Patent
Cacoub

(10) Patent No.: US 12,162,031 B2
(45) Date of Patent: Dec. 10, 2024

(54) WATER JET DEVICE FOR RECREATIONAL PURPOSES, SAID DEVICE FORMING A DOME

(71) Applicant: EURO-MÉDITERRANÉENNE DE TOURISME RÉSIDENTIEL ET DE SERVICES, Paris (FR)

(72) Inventor: Alain Cacoub, Paris (FR)

(73) Assignee: EURO-MÉDITERRANÉENNE DE TOURISME RÉSIDENTIEL ET DE SERVICES, Paris (FR)

( * ) Notice: Subject to any disclaimer, the term of this patent is extended or adjusted under 35 U.S.C. 154(b) by 537 days.

(21) Appl. No.: 17/604,886

(22) PCT Filed: Apr. 8, 2020

(86) PCT No.: PCT/EP2020/059946
§ 371 (c)(1),
(2) Date: Oct. 19, 2021

(87) PCT Pub. No.: WO2020/212210
PCT Pub. Date: Oct. 22, 2020

(65) Prior Publication Data
US 2022/0212221 A1 Jul. 7, 2022

(30) Foreign Application Priority Data
Apr. 19, 2019 (FR) .................................. FR1904244

(51) Int. Cl.
*B05B 17/08* (2006.01)
*B05B 1/20* (2006.01)
(Continued)

(52) U.S. Cl.
CPC .............. *B05B 17/085* (2013.01); *B05B 1/20* (2013.01); *B05B 1/323* (2013.01); *B05B 12/008* (2013.01); *B05B 12/06* (2013.01); *B05B 15/625* (2018.02)

(58) Field of Classification Search
CPC ........... B05B 1/08; B05B 1/083; B05B 1/086; B05B 1/14; B05B 1/20; B05B 1/323;
(Continued)

(56) References Cited

U.S. PATENT DOCUMENTS 3,432,099 A * 3/1969 Boniecki ................. B05B 17/08 239/18
2002/0189548 A1* 12/2002 Northrop ................. A01K 7/00 119/74
(Continued)

FOREIGN PATENT DOCUMENTS

DE 20 2006 011 244 U1 10/2006
GB 2450963 A * 1/2009 ............. A01G 13/00
(Continued)

OTHER PUBLICATIONS

English translation of DE 2006 011 244 U1 (Cited on IDS filed Oct. 19, 2021) (Year: 2006).*
(Continued)

*Primary Examiner* — Darren W Gorman
(74) *Attorney, Agent, or Firm* — Maier & Maier, PLLC

(57) ABSTRACT

A water jet device for recreational purposes, in particular a fountain, having: a jet head with at least one water infeed opening and at least one set of water outlet nozzles, the nozzles being arranged in a same plane and on a peripheral line of the jet head, the nozzles including respective outlets oriented towards the outside of the jet head, a water flow regulator supplying the nozzles to produce a water velocity defining a water jet, exiting each nozzle, having a selected
(Continued)

substantially parabolic-shaped path, the water jets exiting the nozzles forming at least one dome portion, and at least one water supply column made of a rigid material and including an inlet connected to a water infeed and a water outlet connected to the opening of the jet head and mechanically integral thereto, the supply column having the selected parabolic shape to blend with the dome portion.

17 Claims, 8 Drawing Sheets

(51) Int. Cl.

| | |
|---|---|
| ***B05B 1/32*** | (2006.01) |
| ***B05B 12/00*** | (2018.01) |
| ***B05B 12/06*** | (2006.01) |
| ***B05B 15/625*** | (2018.01) |

(58) Field of Classification Search

CPC ..... B05B 1/326; B05B 12/004; B05B 12/006; B05B 12/008; B05B 12/06; B05B 15/625; B05B 17/08; B05B 17/085

See application file for complete search history.

(56) References Cited

U.S. PATENT DOCUMENTS

2006/0101570 A1 5/2006 Kunkel
2010/0276508 A1* 11/2010 Davies ................ F21V 23/0435
239/18

FOREIGN PATENT DOCUMENTS

JP H07108201 A 4/1995
JP 2677772 B2 11/1997
JP 2010110694 A 5/2010

OTHER PUBLICATIONS

International Search Report issued on Jul. 7, 2020 in corresponding International application No. PCT/EP2020/059946; 4 pages.
Examination Notice issued on Jan. 19, 2024, in corresponding European Application No. 20715913.8, 12 pages.
Intention to Grant issued on Jun. 7, 2024, in corresponding European Application No. 20715913.8, 79 pages.

* cited by examiner

WATER JET DEVICE FOR RECREATIONAL PURPOSES, SAID DEVICE FORMING A DOME

FIELD

The invention relates to water jet devices for recreational purposes, for example of the fountain type or the like.

BACKGROUND

Known from the prior art are such devices applying water jets distributed in regular angular increments over 360°, with water ejected in a desired parabolic shape (except when there is strong wind or other disruptions). As shown in FIG. 7, such a device comprises several water infeed pipes Tub (under pressure), each capable of emitting a water jet J, such that the set of jets forms a hollow cupola in which the center is occupied by the pipes Tub.

Such a cupola shape can give pleasure to users, not only visual or auditory (from the sound of falling water), but also to cool off, with it being possible for users to place themselves under the cupola, as shown in FIG. 8.

However, a device of the type illustrated in FIG. 7, with the center of the cupola occupied by the water jet pipes, does not allow an embodiment as illustrated in FIG. 8, for example with furniture MOB arranged inside the cupola of water J. A central column of water pipes Tub as illustrated in FIG. 7 would prevent the placement of such furniture and would not allow users to see each other under the cupola (thus interfering with any desired social interaction between users).

The invention improves the situation.

SUMMARY

For this purpose, it proposes a water jet device for recreational purposes, in particular of the fountain type, comprising:

- a jet head equipped with at least one water infeed opening and at least one set of water outlet nozzles, the nozzles of said set being arranged in a same plane and on a peripheral line of the jet head, the nozzles having respective outlets oriented towards the outside of the jet head,
- a water flow regulator supplying the nozzles in order to produce a water velocity defining a water jet, exiting each nozzle, having a path of chosen substantially parabolic shape, the set of water jets exiting the nozzles forming at least a dome portion, and
- at least one water supply column, made of a rigid material and comprising an inlet connected to a water infeed and a water outlet connected to the opening of the jet head and mechanically integral thereto, said supply column having said parabolic shape chosen to blend in with the dome.

Thus, it is understood that said jet head is arranged at the top of said dome formed by the set of water jets. It is then necessary to provide at least one rigid pipe, formed by said column, ensuring both the supply of water to the jet head and the mechanical retention of the head at the top of the dome (as illustrated in FIG. 1 discussed in detail below). The column, which itself is of the same general shape as a jet, thus advantageously blends in with the dome.

DETAILED DESCRIPTION

The jet head may include a set of nozzles arranged in a same plane, or even several sets of nozzles (N sets) arranged in respective parallel planes (N planes), in order to give a "thickness" to the water in said dome.

The dome itself may have a hemispheric cupola shape or any other dome shape.

Figure 2A:
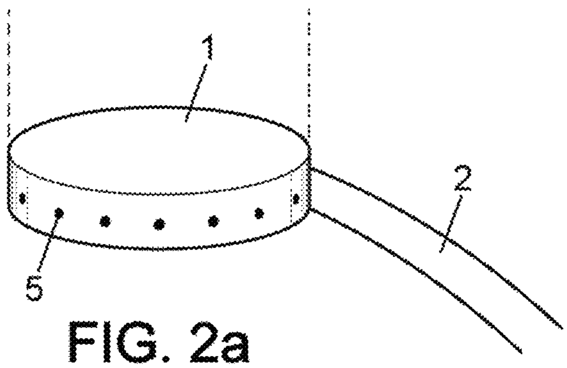
FIG. 2*a* represents the water jet head of the device.
Figure 2B:
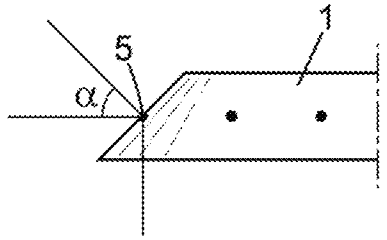
FIG. 2*b* represents the angle of tilt of the nozzles of the water jet head.
Figure 2C:
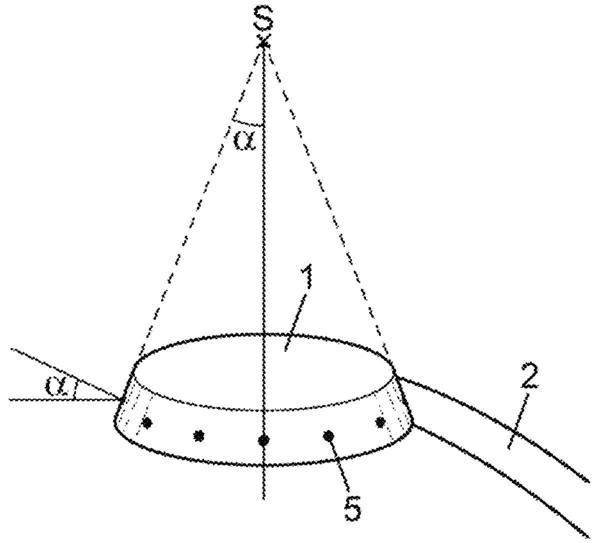
FIG. 2*c* represents the water jet head in a second possible form.

In the case of a hemisphere, typically the nozzles of said set can be arranged on at least one circular arc in a same plane (this circular arc forming said peripheral line). The respective outlets of the nozzles are then oriented towards the outside of a cylinder portion (as illustrated in FIG. 2*a*) or of a cone portion (as illustrated in FIGS. 2*b*, 2*c*) having its apex located above the jet head, and having a central axis perpendicular to the plane of the set of nozzles. The dome portion formed by the set of water jets exiting the nozzles thus has the shape of a cupola portion.

In such an embodiment, the head can typically have a round shape.

Alternatively, the shape of the head can be elliptical or oblong, and in this case the dome has a spheroid or similar shape. The head can also have a polygonal shape and thus generate a dome for which the trace on a horizontal plane corresponds to a polygon.

Furthermore, the nozzles may for example be distributed over the circumference of the head (or over only part of this circumference, for example to allow users to "enter" under the dome without being sprayed). Of course, the jets of each nozzle can be interrupted by controlling at least one valve mounted on each nozzle, as will be seen below, which makes it possible to maintain an implementation in which the nozzles are distributed over the circumference of the head while still allowing users to enter under the dome without being sprayed, simply by momentarily interrupting the jet from a few nozzles.

Furthermore, the term "jets" exiting the head is understood to mean the fact that this jet head can emit continuous jets of water, cyclically interrupted jets of water (successive continuous segments or "dashes"), or "drop by drop" jets of water ("dotted", like rain), by means of the water inflow therein.

The nozzles of a same set are arranged for example at regular angular intervals, in a same plane, making it possible to obtain the desired regular dome or cupola shape by means of the spatial arrangement of the nozzles. The shape of the dome thus depends on:

- the velocity at which the water exits the nozzles (forming said parabolic path), on the one hand, and
- the shape of the periphery of the jet head (oval, polygonal, round, or other).

The water infeed column is mechanically fixed (typically without the desired possibility of relative movements between the water infeed column and the jet head). The opening of the jet head, intended to receive the water supply column, is for example at the same angular distance from the nozzles located to either side thereof and in the same plane as the nozzles of the head (see for example FIG. 2*a*).

The end of the column may include a pipe of a slightly smaller diameter than the diameter of the opening of the jet head, for example to be able to be inserted therein by force, in an embodiment where all the component parts of the device are available as a kit.

Advantageously, the water supply column is designed in a rigid material in order to support the jet head. In addition, the column has the same parabolic shape as that of the jets (same coefficient "a" of the type $y=ax^2$) in order to be perfectly integrated into the dome with the jets exiting the head. An optical effect is created, and the user has the illusion of seeing a dome composed solely of water.

The jet head may have its nozzles arranged on a cylinder portion as illustrated in FIG. 2*a* described in detail below, or alternatively may be arranged on a cone portion as illustrated in FIG. 2*c*, on which the apex S of the cone is located above the jet head 1. In either of these configurations, the central axis of the cylinder or cone is perpendicular to the plane of the jet head (i.e. the plane in which the circular arc formed by the nozzles is inscribed). This plane of the nozzles may be horizontal as shown in FIG. 2*a* or FIG. 2*c*. Nevertheless, it may be slightly tilted if necessary to create a particular aesthetic effect. It must remain less than 90°, however, in order to give the jets a substantially parabolic shape to obtain the desired dome (or more accurately here, cupola) effect.

Figure 8:
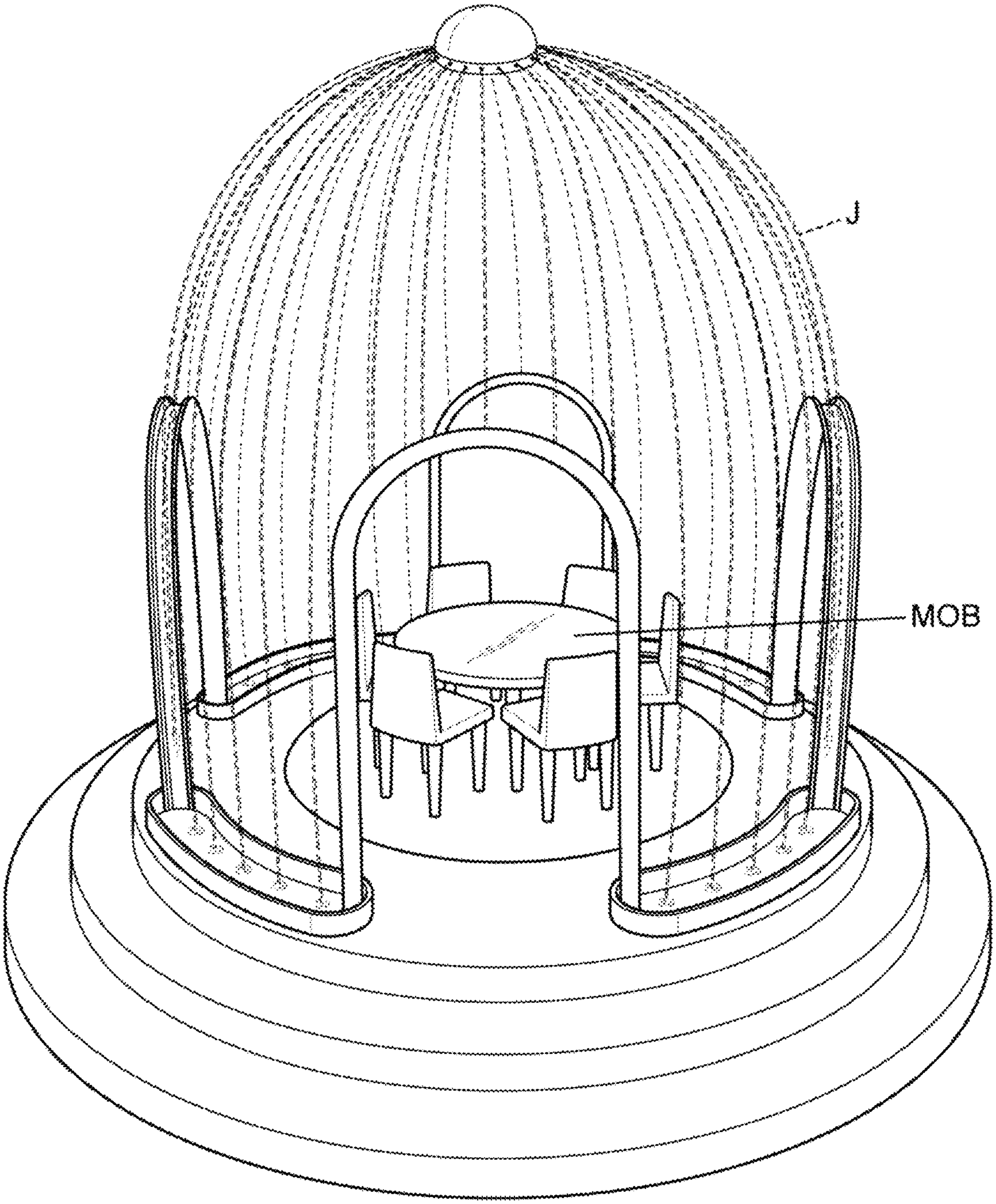
FIG. 8 illustrates a mode of use of the device.
Figure 9A:
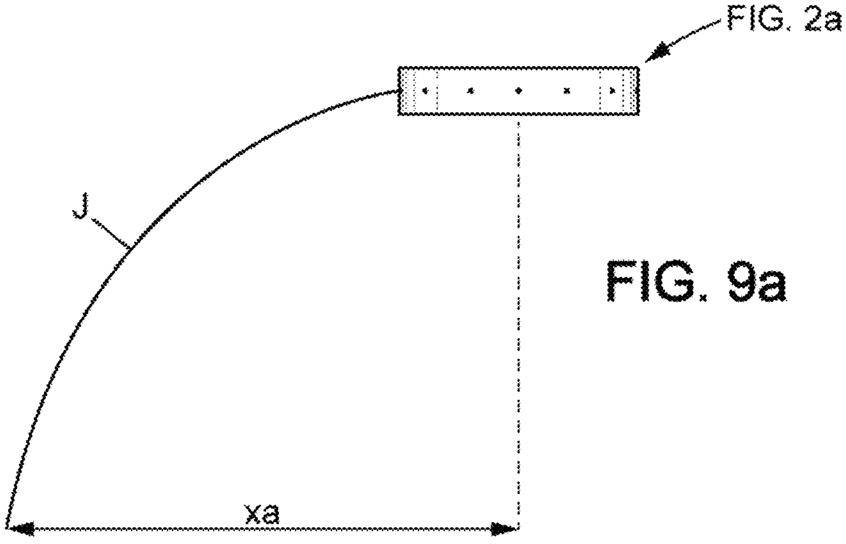
FIG. 9*a* represents the direction of the jet for the use of the jet head of FIG. 2*a*.
Figure 9B:
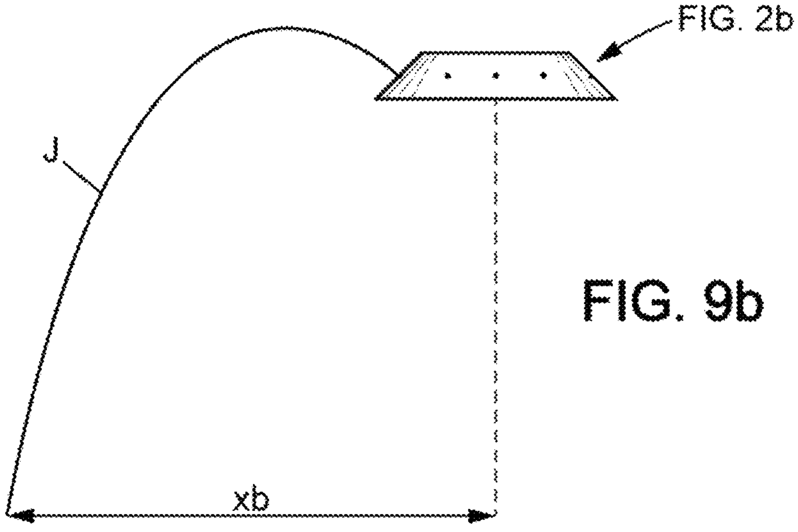
FIG. 9*b* represents the direction of the jet for the use of the jet head of FIG. 2*b*.

The jets exiting a cylinder portion as shown in FIG. 2*a* are first in a horizontal plane, then "fall" downward, as shown in FIG. 9*a*. In the embodiment where the nozzles are part of a cone portion with its apex at the top and having the half-angle $\alpha$ as illustrated in FIG. 2*c*, the jet exits at this angle $\alpha$ so as to reach a range xb, as illustrated in FIG. 9*b*, this range xb possibly being greater than the range xa in the case of ejection from the cylindrical base of FIG. 9*a*. Indeed, if for example the angle $\alpha$ is close to 45°, the range xb can be the maximal range, which thus can make it possible to provide a large space under the dome (possibly for tables and chairs as illustrated in FIG. 8).

Figure 1:
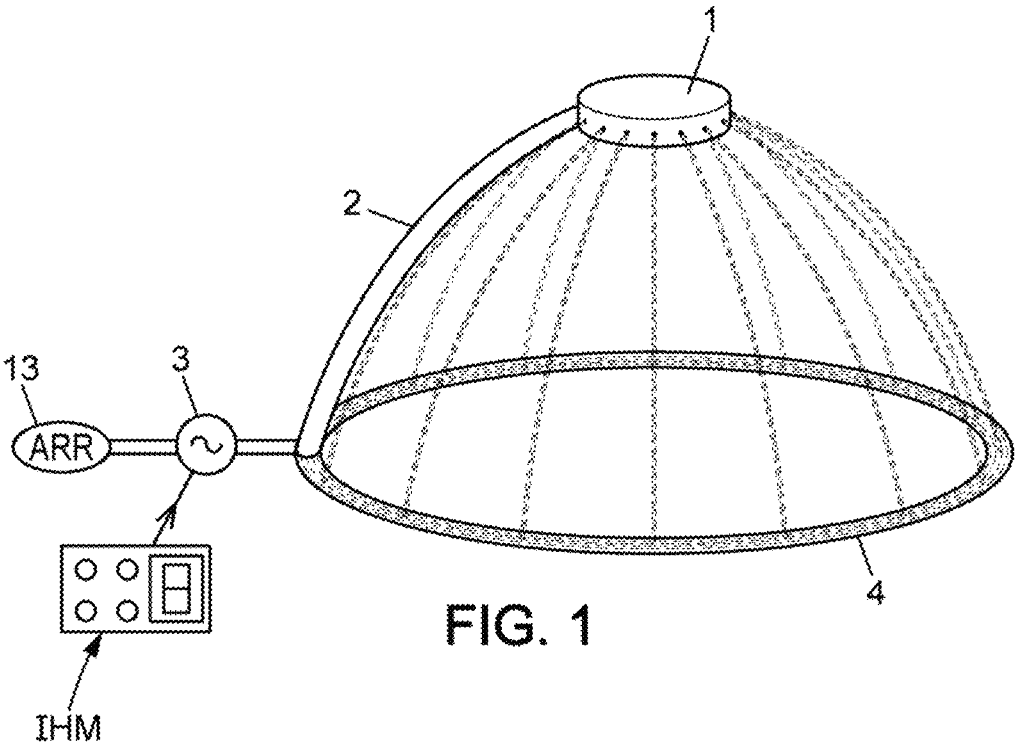
FIG. 1 represents a water jet device.

It should be noted, however, that a "perfect" cupola shape (as illustrated in FIG. 1) is obtained with a tilt angle of the nozzles of the jet head that is equal to 0° (corresponding to a configuration of the nozzles on a cylindrical base as illustrated in FIG. 2*a*).

Thus, the generic term "dome" is understood here to mean both the cupola shape presented in FIG. 1, and a cupola shape that is slightly flattened at its top, or even slightly concave with a non-zero angle $\alpha$. Similarly, the "dome" may have a generally rounded shape at the bottom, but in a variant may have a square base, or more generally polygonal.

However, in one embodiment of the invention where a cupola shape is desired, the nozzles of said set of nozzles are arranged on at least one circular arc within a same plane, the nozzles comprising respective outlets oriented towards the outside of a cylinder portion or of a cone portion having its apex located above the jet head, and having a central axis perpendicular to said same plane, the dome portion formed by the set of water jets exiting the nozzles more particularly having the shape of a cupola portion.

Of course, the plane of the set of nozzles of the jet head forms a non-zero angle with a vertical plane (so as to maintain the parabolic shape of the jets' path, and a general dome shape).

In one embodiment of the invention, the columns are designed of a rigid material that is at least translucent (or even transparent) in order to blend perfectly with the jets exiting the nozzles of the head. Thus, the chosen material may be a polymer for example such as plexiglass, or glass, or other material.

In one embodiment of the invention, the device comprises a support base, mechanically integral to the inlet of the column and which preferably extends for a distance, from the inlet of the column, that is greater than or equal to a diameter of the dome.

Figure 3:
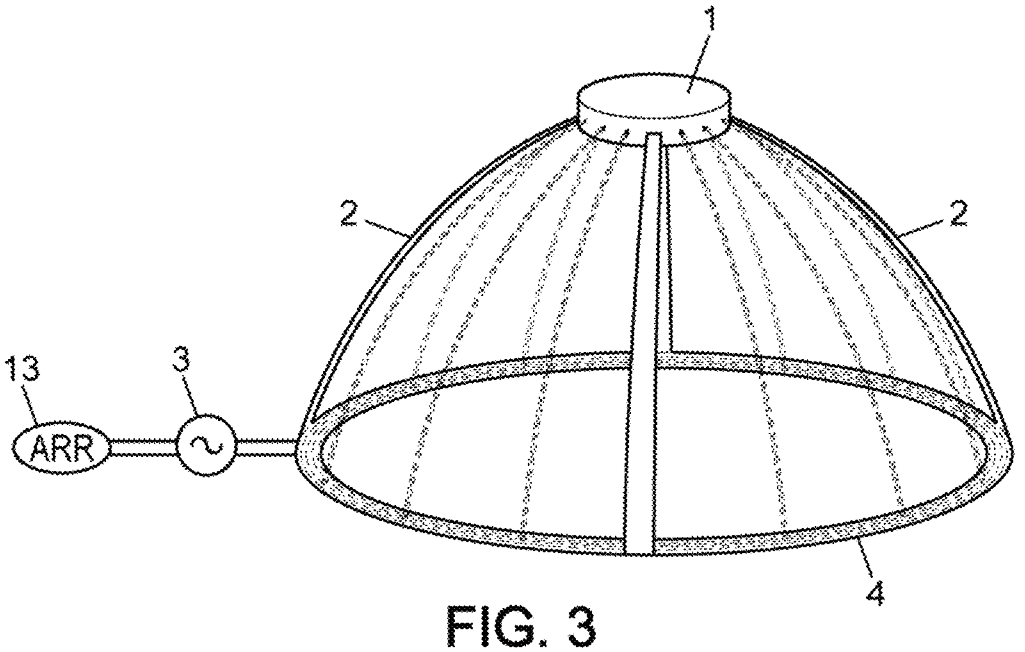
FIG. 3 represents a water jet device with a plurality of columns.

Such a "support base" is labeled 4 in FIG. 1 and FIG. 3. It can be, in the examples illustrated, a ring (or another shape such as polygonal, elliptical, or a ring section), connected to the bottom of each of the water infeed columns 2. This base thus provides support for the device in its entirety and more particularly for the water jet head. In an embodiment presented in detail below, the support base is configured as a trough for collecting the water exiting the head and its diameter thus corresponds to the trace of the dome on the ground. It will then be understood that in such an embodiment, it is preferable to control a regular flow of water exiting the jet head, so that most of the water coming from the jet head is collected in the trough.

Figure 10:
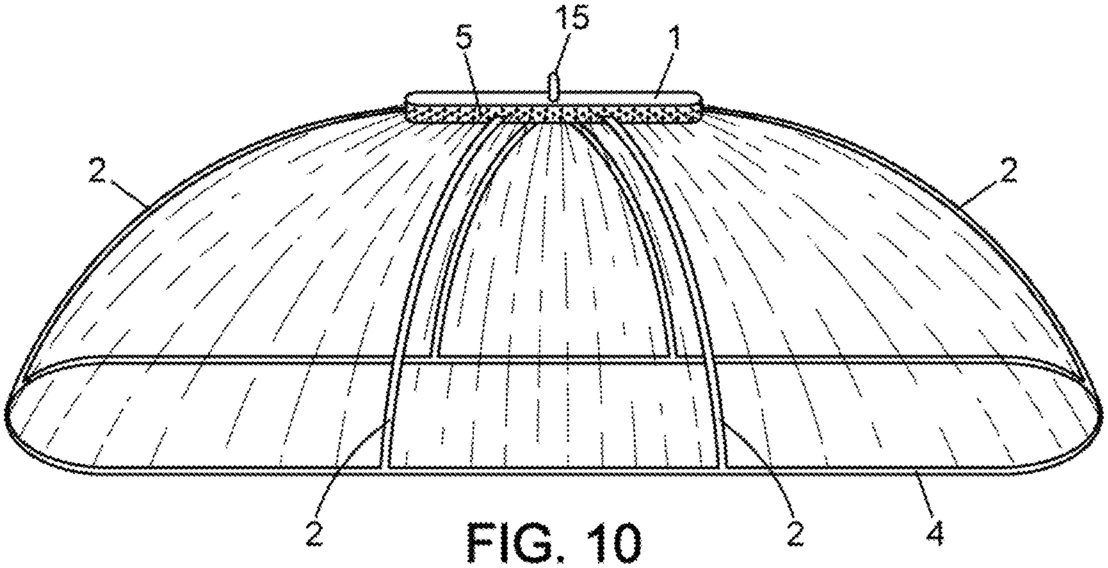
FIG. 10 illustrates an embodiment of a dome with a rectangular-oval base according to one possible embodiment.

In one embodiment of the invention, the jet head is of a generally elliptical, circular, or polygonal shape (for example rectangular or square), or else oval (as illustrated in FIG. 10), and comprises a plurality of openings distributed at regular angles over the general shape. The device can then comprise a plurality of water supply columns (as also illustrated in FIG. 10 or in FIG. 3), all made of a translucent rigid material and each comprising an inlet connected to a water infeed and a water outlet connected to an opening provided in the jet head and mechanically integral thereto. These supply columns also preferably each have said chosen parabolic shape.

Such an embodiment with several water supply columns advantageously makes it possible to provide large dome shapes (high and wide) and thus to support the weight of a jet head sized to eject a significant amount of water at a high flow rate. Such an embodiment typically makes it possible to obtain a result as illustrated in FIG. 8, with furniture that can be installed under the dome (here a cupola) without getting it wet. The columns may be:

- connected by a trough or a hollow ring (as illustrated in FIG. 3) for internal water circulation in order to supply the columns, with a single water infeed (denoted 13 in FIG. 3), or
- each connected to an independent water supply.

The hollow ring forming the support base can be made of the same material as the water infeed columns (rigid and translucent).

In another variant, only one column is supplied with water while the others serve only to support the device. They have a parabolic shape similar to one of the jets and are of a translucent and sturdy material. They may be solid or hollow.

In one embodiment of the invention, each of the column inlets is mechanically integral to the support base, and, the support base being of the same general shape as the jet head, the column inlets are distributed at regular distances over said general shape of the support base, the columns and the base thus forming a "multipod" as illustrated in the example of FIG. 3.

In one embodiment of the invention, the support base comprises at least one water collection tank, forming said water infeed, and the device comprises a water pump for the collection tank, connected to the flow regulator.

Figure 5:
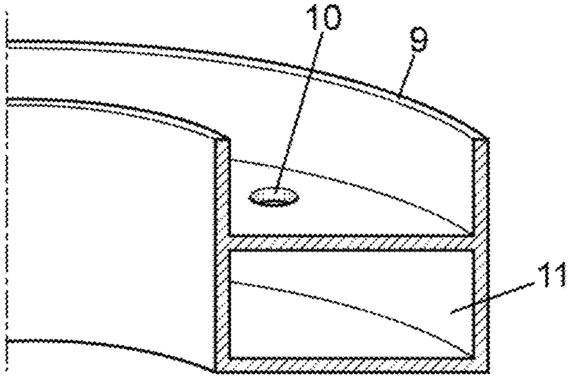
FIG. 5 represents a cross-section of a water collection tank.

In this embodiment, the device recycles the water ejected from the head. The collection tank may be filled with water before the device is actually activated. In the case of supplying water, for example, the water collection tank can store the water flowing from the jets of the spray head, so as to fill an internal reservoir 11 (as illustrated in FIG. 5). A pump may be provided in this reservoir, using the water from the reservoir to re-inject it back towards the jet head, this pump then being controlled by said flow regulator.

In one embodiment of the invention, the device further comprises a pressure gauge cooperating with the flow regulator to measure a pressure in the jet head.
The flow regulator is arranged in particular to increase the flow rate of water from the water infeed, in the event that a pressure below a predetermined threshold is detected in the jet head.

Thus, particularly when the device comprises a water collection tank for example, the pressure gauge measures the water pressure at the jet head. If the water pressure is not high enough, the flow regulator increases the flow of water from the collection tank via the pump in order to return to sufficient pressure at the jet head to obtain the desired dome shape as explained above.

In other embodiments, the pressure gauge may be placed, for example, at the inlet of the column.

In one embodiment of the invention, the device further comprises an additional water supply, as backup in the event of a sustained detection of pressure below a predetermined threshold in the jet head.

The term "sustained" is understood here to mean the fact that this detection is typically effective for a duration exceeding a threshold.

For example, the pressure gauge measures the pressure of the water in the jet head. If the pressure is lower than the predefined pressure and the water in the collection tank is no longer sufficient to return to this pressure, then the additional water supply is controlled by the flow regulator until the pressure level threshold measured by the pressure gauge is reached.

In one embodiment of the invention, the device further comprises an input member enabling a user to set said predetermined threshold.

The user can thus adjust the water pressure in the jet head to adapt the shape of the dome as desired. The higher the pressure, the larger the dome.

In one embodiment of the invention, the flow regulator is configured to cut off the water supply to the nozzles cyclically, and to cause a cyclically interrupted jet to exit each nozzle.

Three main types of jets can be produced by the device:
- the continuous jet when the water flow rate is regular: the nozzles are then continuously open,
- the jet interrupted cyclically or in successive water segments: for example, the flow regulator cuts off the water supply every n periods in order to obtain a jet interrupted n times over its length; the nozzles then open and close according to the water inflow,
- the drop-by-drop or "dotted" jet: the water cut-off speed is greater than it is for the interrupted jet.

In one embodiment of the invention, the device comprises, at each nozzle outlet of the jet head, at least one outwardly opening valve, linked to a hinge and urged inward by a spring.

The nozzles of the jet head have a multitude of valves connected to the head by hinges placed on the external face of the valve and head, enabling the valves to open during the flow of water. The valves of the nozzles are also attached to the head by a spring placed on the internal face of each valve and attached to the jet head. If the water pressure is insufficient, the valves are closed, and the spring is then at rest. When the pressure becomes high enough to flow, the springs stretch and the valves open, allowing the water to flow.

Thus, in a "mechanical" embodiment based on valves with springs as presented above, the flow regulator can be formed by said valves, in cooperation with the water infeed, such that:
- a pressure greater than a threshold, for the water coming from the water infeed into the jet head, causes the valves to open, and
- after the valves open, the release of water from the jet head generates a drop in water pressure in the jet head and causes the valves to close.

In one embodiment, it may be provided that the device further comprises an anemometer for:
- identifying a wind direction and force,
- increasing a flow rate of water through a first portion of nozzles among the set of nozzles, said first portion of nozzles being located facing the wind, and decreasing a flow rate of water through a second portion of nozzles among the set of nozzles, said second portion of nozzles being complementary to the first portion and located facing away from the wind.

It may further be provided that this anemometer can also be used to optionally interrupt the water jet cyclically depending on the force of the wind, into successive water segments or drops. The anemometer may also be used to completely shut off the jets if a very high force wind is detected. In this case, a sensor simpler than an anemometer (simply detecting the presence of wind or a wind force) can also be used in a less sophisticated and possibly more economical embodiment. In such an embodiment, the device can thus include at least one sensor for identifying a wind force and at least cyclically (or completely) interrupting the water jet, depending on the wind force, into successive segments or drops of water.

Figure 6:
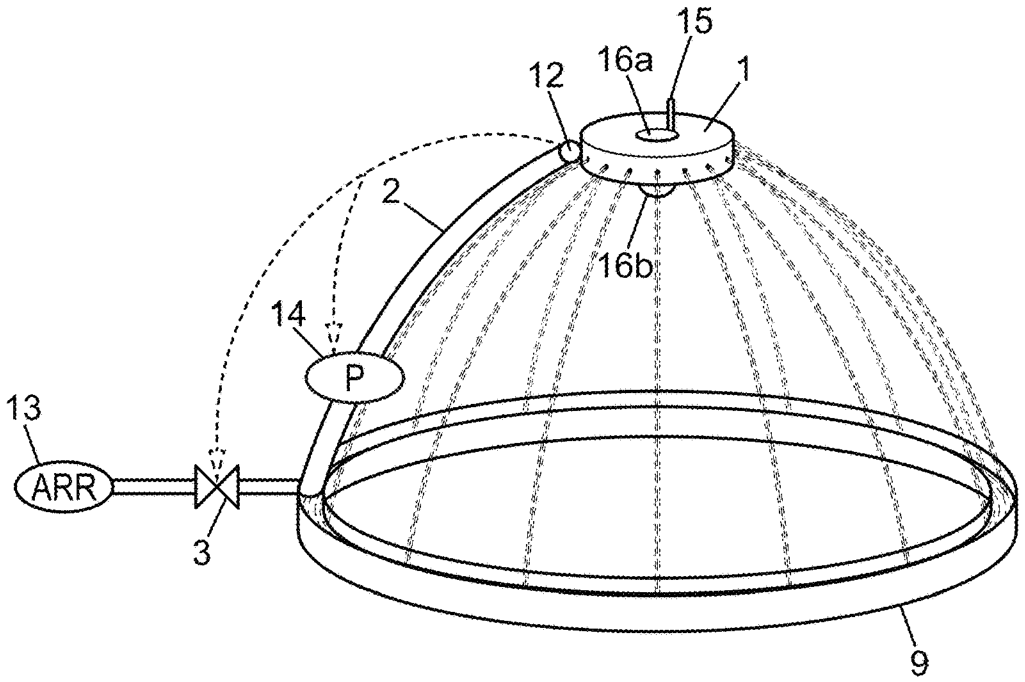
FIG. 6 represents a water jet device in one embodiment.
Figure 7:
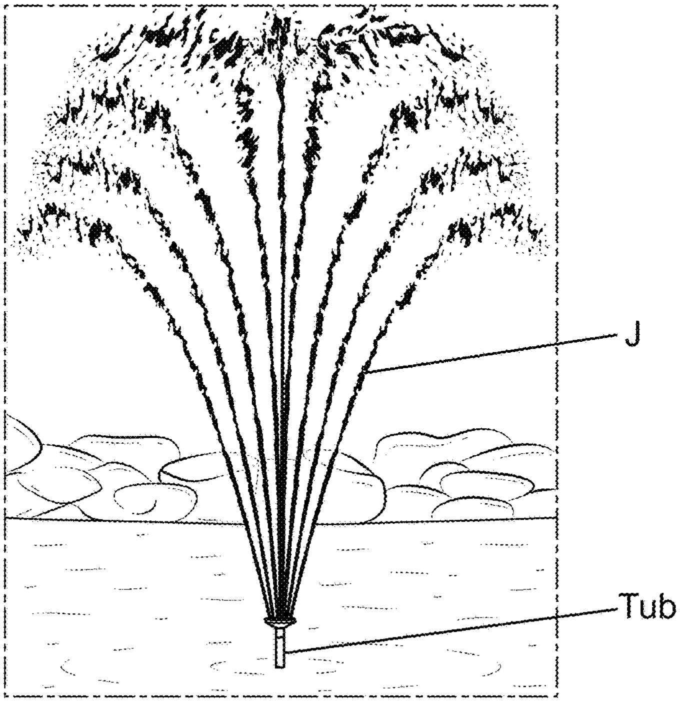
FIG. 7 (PRIOR ART)
FIG. 7 illustrates a device of the prior art.

In one embodiment, the jet head may comprise, for example in a lower surface (as illustrated in FIG. 6), at least one light source **16*b* (for example a series of light-emitting diodes or other sources) and a power supply 16*a* (for example a battery or a photovoltaic module or others) for the light source 16*b***.

Other features, details, and advantages will be apparent from reading the detailed description below, and from analyzing the accompanying drawings, in which:

FIG. 1 represents a water jet device. This device comprises:

- a jet head 1,
- a water supply column 2,
- a flow regulator 3,
- a water infeed 13,
- a support base 4, and
- a setpoint input interface IHM for selecting the flow rate to be regulated.

In particular, the column 2 comprises an outlet pipe inserted by force for example into an opening of the jet head 1. The other end of column 2 is connected to the water infeed 13 via the flow regulator 3. The assembly of head 1 and column 2 is mechanically retained by the support base 4. In the example of FIG. 1, the base 4 is in the form of a hollow circular hoop having an opening into which the water infeed pipe of the column 2 is inserted by force for example.

During operation, the jet head 1 (comprising jet nozzles on its periphery as described in detail below) generates a dome of water which the column 2 (which can be transparent or translucent) blends with. In the example illustrated, the impact of the water of the dome on the ground forms a circle of variable radius depending on the pressure at the jet head 1 (or in an equivalent manner on the flow rate chosen for the regulator). Thus, a user can select for example the pressure and/or flow rate via the interface IHM (for example a remote control or an input interface connected to the flow regulator 3), and, from there, the ground radius of the impact of the dome.

Such an embodiment typically allows the diameter of the water dome formed to be adjusted according to the requirements of the recreational elements (table, chairs, armchairs, or other) to be placed under the dome.

The assembly of flow regulator, column, base, and jet head can be a kit to be installed on a water infeed 13 (garden tap or other).

In the example shown, the device is placed on a flat surface. The jet head 1 is held high by the column 2 of parabolic shape (like the water jets exiting the nozzles of the head 1, in order to blend with them). The head 1 is fed by the water infeed 13, for which the flow rate is controlled by the water flow regulator 3. The jet head 1 is positioned above the center of the support base 4, the device resting on the support base 4.

The water from the water infeed 13 is regulated by the flow regulator 3 then passes through the column 2 to reach the jet head 1 and flows so that the water dome is formed by the multitude of jets coming from the jet head 1. The position of the jet head 1 makes it possible to have the shape of a water cupola, by means of the water outlet nozzles.

The flow regulator 3 regulates the water inflow into the jet head in order to obtain parabolic-shaped jets. To this end, the flow rate is greater than a first threshold for a rapid ejection of water, then assuming a parabolic shape due to gravity as illustrated in FIGS. 9*a* and 9*b*. The flow rate must be greater than a second threshold so that the water does not spray the items placed under the dome, and more generally so that the dome retains its shape.

In this regard, the jet pipes of the head 1 are arranged at the periphery of the head as illustrated in FIG. 1; this head 1 can be:

- circular, in which case the dome can have a cupola shape forming a circular trace on the ground,
- elliptical, in which case the dome can have a flattened cupola shape forming an oval trace on the ground,
- square or rectangular, with a dome shape having a square or rectangular base shape on the ground,
- polygonal, in which case the dome can have a cupola shape forming a polygonal trace on the ground.

The jet head 1 comprises a multitude of nozzles 5 equidistant from one another, placed on the circumference of the jet head 1 in the same horizontal plane. The column 2 is connected to the jet head 1, enabling the routing of water to the outlet nozzles 5. The water outlet nozzles 5 are oriented at an angle α, necessarily less than 90 degrees (as illustrated in FIG. 2*b*), in order to obtain the parabolic shape of the jets.

FIG. 2*a* shows a jet head 1 of a water jet device, of circular shape, connected to column 2. The shape of the jet head may vary depending on the embodiments. For example, it may have a cylindrical shape as illustrated in FIG. 2*a* so that each opening is in a vertical plane. In this case, the jet J is parabolic as illustrated in FIG. 9*a*, with a radius xa of the accordingly formed dome such that $xa=v_o(2h/g)^{1/2}$ where:

- $v_o$ is the water ejection velocity from the nozzles,
- h is the height of the head 1 above the ground,
- g is gravity (9.8 $m/s^2$).

Alternatively, the head may have a conical shape as illustrated in FIG. 2*c*, with the apex S of the cone at the top, the angle of the cone being denoted α. Such an embodiment makes it possible to project the water exiting the nozzles further out (to distance xb as illustrated in FIG. 9*b*), particularly when a is close to 45°.

Figure 2D:
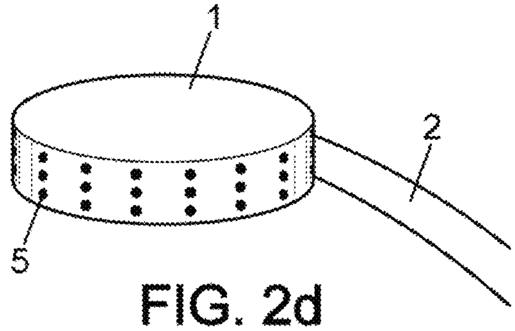
FIG. 2*d* represents the water jet head with a plurality of rows of nozzles arranged in respective parallel planes in order to impart a desired thickness to the dome formed by the water jets.

Preferably, to effectively conceal the water column within the set of jets, the choice may be made, as illustrated in FIG. 2*d*, to create a water jet having a certain thickness greater than a threshold. A water jet head is thus provided comprising a plurality of rows of nozzles arranged in respective parallel planes, in order to impart this desired thickness to the dome formed by the water jets.

FIG. 3 represents a water jet device with a multitude of columns 2, all having homologous parabolic shapes blending with the dome of water jets exiting the nozzles 5. This embodiment of the device can be used for a jet head of a height greater than a maximum height to be supported by a single water infeed column 2. The device comprises a jet head 1 connected to the multitude of water infeed columns 2, a water infeed 13 regulated by a flow regulator 3, and a support base 4. The columns 2 are spaced apart by an angle that is equal for all columns around the jet head.

Figure 4A:
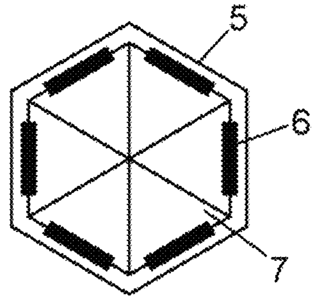
FIG. 4*a* represents a nozzle of the water jet head.

FIG. 4*a* represents a water outlet nozzle 5 of the jet head 1. The nozzle 5 comprises a multitude of valves 7 connected to the jet head by means of a hinge 6 positioned on the external face of the valves, the hinge 6 allowing the valve 7 to swing open when water exits the nozzle 5.

Figure 4B:
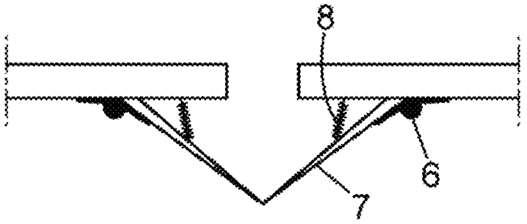
FIG. 4*b* represents a horizontal cross-section of the nozzle in one mode of operation.

FIG. 4*b* represents a horizontal cross-section of a nozzle 5 in one mode of operation, the valve 7 being supported from the inside by a spring 8. The spring 8 is placed on the inside face of the valve 7 and is connected to the jet head 1.

In the embodiment where the water infeed is not activated (as illustrated in FIG. 4*b*), for example, the nozzles 5 are in the closed position. The valves 7 have swung closed, the springs 8 are relatively relaxed (compared to an alternate position where they are more stretched), not allowing water to flow through the nozzles 5.

Figure 4C:
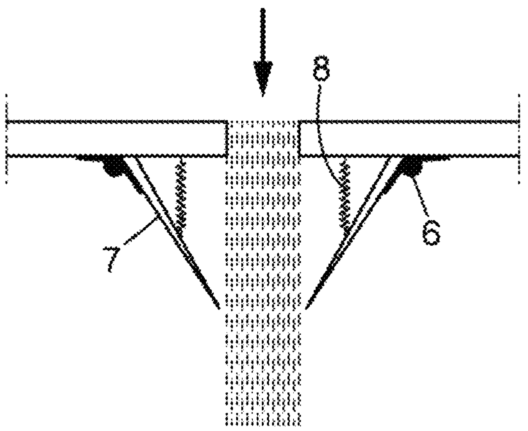
FIG. 4*c* represents a horizontal cross-section of the nozzle in a second mode of operation.

In the embodiment where the water infeed is activated (as illustrated in FIG. 4*c*), the pressure in the head 1 increases, pushing on the valves 7 until the latter 7 transition to the open position. The springs 8 are stretched by the pressure of the water inflow into the jet head of the device, so that when the pressure falls below a threshold, the inward urging of the springs causes the valves to close again. In steady state, the valves can open and close cyclically. Thus, the jets can be interrupted cyclically, forming broken segments of water. Such an embodiment using segmented jets makes it possible to limit the disruption of the dome shape by an occasional gust of wind outdoors. Furthermore, it is possible to use an anemometer 15 (as illustrated on the top of the jet head by way of example in FIGS. 6 and 10) to identify a wind direction and increase the flow rate from certain nozzles facing the wind and reduce it from nozzles facing away from the wind. In this regard, the valves forming the nozzles, illustrated in FIGS. 4*a*, 4*b*, 4*c*, can be replaced by electronic nozzles controlled by the anemometer 15 and capable of producing the various possible jets (continuous, segmented, or in droplets).

FIG. 5 represents a water collection tank 9, here comprising holes 10 in order to collect the water flowing via the jet head and a water reservoir 11, underlying the compartment with holes 10 and collecting the water flowing through the holes 10.

FIG. 6 represents a water jet device in an embodiment comprising, in addition to the jet head 1, the water infeed column 2, and the flow regulator 3:

- a pressure gauge 12 for measuring the water pressure (preferably in the jet head or alternatively at the foot of the column),
- a water collection tank 9 (to avoid wasting the water exiting the nozzles),
- a pump 14, to reinject water from the tank 9,
- an anemometer 15, to define the shape of the water jets exiting the nozzles according to the force of the outdoor wind.

Nevertheless, the water infeed 13 can continue to be used in this embodiment, as a backup in the event that the loss of water to outside the tank 9 no longer allows having sufficient pressure at the jet head 1.

Thus, in the example shown, the pressure gauge 12 measures the water pressure and activates the flow regulator 3 connected to the water infeed 13 if the amount of water in the collection tank 9 is insufficient to supply the device on its own. The pressure gauge 12 can further measure the water pressure in order to activate the pump 14 in the event that the pressure is lower than said pressure threshold for obtaining a dome effect.

Furthermore, as illustrated in FIG. 6, the jet head may include on its underside a light source 16*b* such as for example a bar of light-emitting diodes (or other sources) and a power supply 16*a* (typically from a photovoltaic module in an outdoor use of the device) for the light source 16*b*. Moreover, the power supply 16*b* can also power the anemometer 15 illustrated in FIG. 6.

By means of such arrangements, and in particular by the creation of a dome shape in which the jets all have parabolic paths, with water infeed columns of the same shape in order to blend with the dome, such a dome shape makes it possible to define a space for receiving users without the constraint of a central column preventing the placement of any type of furniture under the dome. As illustrated in the embodiment of FIG. 8, it is thus possible to have any type of table in the center of the dome (and not necessarily one with an opening in its center), without blocking social interactions between users.

The invention claimed is:

1. A water jet device for recreational purposes, comprising:

a jet head equipped with at least one water infeed opening and at least one set of water outlet nozzles, the nozzles of said at least one set of water outlet nozzles being arranged in a same plane and on a peripheral line of the jet head, the nozzles having respective outlets oriented towards the outside of the jet head, a water flow regulator supplying the nozzles in order to produce a water velocity defining a water jet, exiting each nozzle, having a path of chosen substantially parabolic shape, the set of water jets exiting the nozzles forming at least a dome portion, and at least one water supply column, made of a rigid material and comprising an inlet connected to a water infeed and a water outlet connected to said at least one water infeed opening of the jet head and mechanically integral thereto, said at least one water supply column having said parabolic shape chosen to blend in with the dome portion, wherein said at least one water infeed opening of the jet head, intended to receive said at least one water supply column, is at a same angular distance from the water outlet nozzles located to either side thereof and in the same plane as the water outlet nozzles.

2. The device according to claim 1, wherein the nozzles of said at least one set of water outlet nozzles are arranged on at least one circular arc in a same plane, the nozzles comprising respective outlets oriented towards the outside of a cylinder portion or of a cone portion having its apex located above the jet head, and having a central axis perpendicular to said same plane, the dome portion formed by the set of water jets exiting the nozzles having the shape of a cupola portion.

3. The device according to claim 1, wherein the rigid material is translucent.

4. The device according to claim 1, further comprising a support base, mechanically integral to the inlet of said at least one water supply column.

5. The device according to claim 1, wherein the jet head is of a generally elliptical, circular, or polygonal shape, and comprises a plurality of water infeed openings distributed at regular distances over said general shape, and the device comprises a plurality of water supply columns made of the rigid material and each comprising an inlet connected to the water infeed and a water outlet connected to each of the plurality of water infeed openings in the jet head and mechanically integral thereto, each of said plurality of water supply columns having said chosen parabolic shape.

6. The device according to claim 5, further comprising a support base, mechanically integral to the inlet of each of the water supply columns, and, the support base being of the same general shape as the jet head, the column inlets are distributed at regular distances over said general shape of the support base.

7. The device according to claim 4, wherein the support base comprises at least one water collection tank, forming said water infeed, and the device comprises a water pump for said at least one collection tank, connected to the flow regulator.

8. The device according to claim 1, further comprising a pressure gauge cooperating with the flow regulator to measure a pressure in the jet head, the flow regulator being arranged to increase the flow rate of water from said water infeed, in the event that a pressure below a predetermined threshold is detected in the jet head.

9. The device according to claim 8, further comprising a support base, wherein the support base comprises at least one water collection tank, forming said water infeed, and the device comprises a water pump for the collection tank, connected to the flow regulator, the device further comprising an additional water supply, as backup in the event of a sustained detection of pressure below a predetermined threshold in the jet head.

10. The device according to claim 8, further comprising an input member enabling a user to set said predetermined threshold.

11. The device according to claim 1, wherein the flow regulator is configured to cut off the water supply to the nozzles cyclically, and to cause a cyclically interrupted jet to exit each nozzle.

12. The device according to claim 1, further comprising, at each nozzle outlet of the jet head, at least one outwardly opening valve, linked to a hinge and urged inward by a spring.

13. The device according to claim 12, wherein the flow regulator is configured to cut off the water supply to the nozzles cyclically, and to cause a cyclically interrupted jet to exit each nozzle, wherein the flow regulator is formed by said valves, in cooperation with the water infeed, and wherein:

a pressure greater than a threshold, for the water coming from the water infeed into the jet head causes the valves to open, and after the valves open, the release of water from the jet head generates a drop in water pressure in the jet head and causes the valves to close.

14. The device according to claim 1, comprising an anemometer for:

identifying a wind direction and force, increasing a flow rate of water through a first portion of nozzles among the at least one set of nozzles, said first portion of nozzles being located facing the wind, and decreasing a flow rate of water through a second portion of nozzles among the at least one set of nozzles, said second portion of nozzles being complementary to the first portion and located facing away from the wind.

15. The device according to claim 1, comprising at least one sensor for identifying a wind force and at least cyclically interrupting the water jets, depending on the wind force, into successive segments or drops of water.

16. The device according to claim 1, wherein the jet head comprises, in a lower surface, at least one light source and a power supply for said at least one light source.

17. The device according to claim 1, wherein the jet head comprises several sets of nozzles arranged in respective parallel planes, in order to give a thickness to the water in the dome portion.

* * * * *